United States Patent [19]

Speranza et al.

[11] Patent Number: 4,540,768

[45] Date of Patent: Sep. 10, 1985

[54] RIM ELASTOMERS MADE FROM TEREPHTHALATE POLYESTER POLYOL DERIVED POLYMER POLYOLS

[75] Inventors: George P. Speranza; Michael Cuscurida; Richard J. G. Dominguez, all of Austin, Tex.

[73] Assignee: Texaco Inc., White Plains, N.Y.

[21] Appl. No.: 658,944

[22] Filed: Oct. 9, 1984

[51] Int. Cl.[3] .................... C08G 18/14; C08G 18/42; B28B 1/24
[52] U.S. Cl. ......................................... 528/79; 264/53; 264/54; 264/328.6; 264/DIG. 83; 521/164; 521/173
[58] Field of Search ................... 528/79; 521/173, 164; 264/328.1, 331.11

[56] References Cited

U.S. PATENT DOCUMENTS

| | | | |
|---|---|---|---|
| 4,048,105 | 9/1977 | Salisbury | 260/2.5 AC |
| 4,100,354 | 7/1978 | Owen | 521/173 |
| 4,296,212 | 10/1981 | Ewen et al. | 521/163 |
| 4,346,229 | 8/1982 | Derr et al. | 521/172 |
| 4,394,286 | 7/1983 | Millick | 252/182 |
| 4,442,237 | 4/1984 | Zimmerman et al. | 521/164 |
| 4,469,823 | 9/1984 | Yeakey et al. | 521/173 |
| 4,469,824 | 9/1984 | Grigsby et al. | 521/173 |

*Primary Examiner*—Herbert S. Cockeram
*Attorney, Agent, or Firm*—Jack H. Park; Kenneth R. Priem; Richard A. Morgan

[57] ABSTRACT

Reaction injection molded elastomers made from polymer polyols derived by reacting a liquid terephthalic polyester polyol with an organic polyisocyanate in the presence of a polyether polyol solvent are described. The liquid terephthalic polyester polyol may be made by reacting residue or scrap polyethylene terephthalate (PET) with an oxyalkylene glycol. The oxyalkylene glycol is preferably either diethylene glycol alone or a mixture of diethylene glycol and at least one other oxyalkylene glycol. The liquid terephthalic polyester polyol is preferably distilled to remove ethylene glycol. RIM elastomers made from these polymer polyols have improved hot tear (green strength) and final tear properties than prior art elastomers.

20 Claims, No Drawings

RIM ELASTOMERS MADE FROM TEREPHTHALATE POLYESTER POLYOL DERIVED POLYMER POLYOLS

CROSS-REFERENCE TO RELATED APPLICATION

This application is related to U.S. patent application Ser. No. 06/658,947, filed Oct. 9, 1984 which relates to polymer polyols derived from liquid terephthalic ester polyols made from the reaction of recycled polyethylene terephthalate with alkylene glycols.

BACKGROUND OF THE INVENTION

1. Field of the Invention

This invention pertains to the field of polyurethane plastics. The invention more particularly relates to reaction injection molded (RIM) elastomers made from polymer polyols derived from the reaction of polyester polyols with an organic polyisocyanate in the presence of a polyether polyol solvent.

2. Description of the Prior Art

The use of a polyol in the preparation of polyurethanes by reaction of the polyol with a polyisocyanate in the presence of a catalyst and perhaps other ingredients is well known. Conventional polyols for flexible polyurethane foams are usually made by the reaction of a polyhydric alcohol with an alkylene oxide, usually ethylene oxide and/or propylene oxide, to a moleclar weight of about 2,000 to 3,000 and above. These polyols are then reacted with polyisocyanate in the presence of water or other blowing agents such as fluorocarbons to obtain polyurethane foams (see, for example, U.S. Pat. No. 2,929,800).

One technique of trying to improve the ultimate polyurethane foam or elastomer is to provide a polyol which is a dispersion of a polymer within a polyol solvent. The polymer may be the reaction product of another, different kind of polyol with a polyisocyanate or may be an unrelated polymer, such as the product in the co-polymerization of styrene and acrylonitrile.

U.S. Pat. No. 3,325,421 discloses a method of making a stable dispersion of a urea in a composition, where the dispersed phase is the reaction product of an organic polyisocyanate and a diamine having at least two reactive hydrogen atoms. The equilibrium product of two polyols, of which at least one is a polyester polyol, may be formed by heating them in the presence of a catalyst according to U.S. Pat. No. 3,666,724. The resulting co-polymer apparently gives better foams and elastomers.

Stable dispersions of polyureas can be prepared from mixtures consisting of hydroxyl-group containing materials, polyamines and polyisocyanates as taught by U.S. Pat. No. 4,089,835. The dispersing media may be a polyether, a polyester, a polyester amide or a polycarbonate, while the polyamine should contain primary or secondary amine groups.

British Pat. No. 2,098,229 discloses that polymer polyols for use in flexible foams may be made by reacting triethanolamine with a polyisocyanate in the presence of a polyol solvent. Polyurea polymer polyols made by the reaction of alkanolamines with polyisocyanates in the presence of polyether polyols and absence of a catalyst, may be stabilized by quenching with a secondiary amine as described in U.S. Pat. No. 4,293,470.

A method for the preparation of stable dispersions of polyisocyanate polyaddition products by reacting organic polyisocyanates with compounds having primary and/or secondary amine groups or primary hydroxyl groups in polyols is taught by U.S. Pat. No. 4,093,569. The reaction is carried out in the presence of 4 wt.% water.

Other disclosures concerning the reaction of alkanolamines with polyisocyanates in a polyol solvent are U.S. Pat. Nos. 4,374,209 and 4,296,213. Polyester polymer polyols made by the reaction of a polyester polycarbonate, a polyether polyol and an organic polyisocyanate is described in U.S. Pat. No. 4,435,527.

SUMMARY OF THE INVENTION

The invention concerns a reaction injection molded elastomer made by reacting in a closed mold ingredients such as a polymer polyol, an amine terminated chain extender and a polyisocyanate. The polymer polyol is made by reacting a liquid terephthalic polyester polyol with an organic polyisocyanate in the presence of a polyether polyol solvent. The liquid terephthalic polyester polyol is made by reacting recycled polyethylene terephthalate with an oxyalkylene glycol, and then stripping ethylene glycol from the reaction to give a mixture of terephthalic polyester polyols which is free from solids upon standing.

DETAILED DESCRIPTION OF THE PREFERRED EMBODIMENTS

It is somewhat unusual to find polymer polyols which give improved properties to reaction injection molded (RIM) elastomers. It is completely unexpected that materials made from recycled or scrap polyethylene terephthalate (PET) and the like would be a component in such a polymer polyol.

The PET Based Polyester Polyols

The liquid terephthalic polyester polyols used as one of the components in the polymer polyols employed in the RIM elastomers of this invention may also be called a "polyol extender". The term "polyol extender" is used to mean any inexpensive polyol material that can be used to replace a portion of a more expensive polyol in a polyurethane formulation. Thus, the supply of expensive polyol is extended and the overall cost of the polyurethane is lowered.

These materials also maintain their liquid phase state and do not precipitate solids upon standing. They thus retain their processing ease. In the preparation of polyurethane elastomers the producer cannot tolerate solids in any feeds since they would stop up the filters and/or give erratic flow rates. In addition, such a polyol mixture is compatible with trichlorofluoromethane (fluorocarbon-11) blowing agent in the instance of blown foam.

While one of the reactants to make the liquid terephthalate polyol components could probably be adipic acid, dimethyl terephthalate (DMT) or polyethylene terephthalate (PET) manufacturing or processing residue or waste, it is must much preferred that the reactant of this type be scrap residue from old, recycled polyethylene terephthalate. By recycled PET is meant waste or scrap PET that has already been used in another form and discarded.

Generally, the scrap or recycled PET may be in any particulate form. A frequently seen form is fragmentized soft drink bottles which appear as clear or colored chips. Polyethylene terephthalate film can also be recycled. Any chopping or pulverizing process which produces small bits of solid PET from the larger, waste recycled article would be appropriate to produce scrap PET useful herein. Sometimes the scrap PET is mixed with a solvent to make a kind of slurry. While scrap PET slurry could be used in the method of this invention, the recycled PET chips without the solvent are also useful.

The recycled PET is first reacted with boiling oxyalkylene glycols. This process tends to form low molecular weight dihydroxy esters of terephthalic acid. Ordinarily, these diesters are quite crystalline and separate from solution as solids. Of course, the preferred products are the aromatic polyester polyol-type compounds.

Preferably, the oxyalkylene glycol has the formula

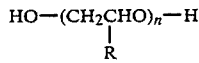

where R is hydrogen or a lower alkyl group of one to four carbon atoms and n is from 2 to 10. The glycol may be a residue or a flash-separated glycol. Glycols which meet this definition are diethylene glycol (DEG), dipropylene glycol, triethylene glycol (TEG), tripropylene glycol and tetrapropylene glycol, among others. Note that this definition of oxyalkylene glycols does not include ethylene glycol or propylene glycol.

It is highly preferred that DEG be one of the oxyalkylene glycol reactants. It is also preferred that another oxyalkylene glycol be present as a co-reactant to help prevent the solids from settling out. Any single oxyalkylene glycol or mixture thereof can be used as the additional co-reactant with the DEG. Although exact proportions of these oxyalkylene glycols is not important, it is preferred that the DEG portion be the largest of the oxyalkylene glycol proportions.

Another preference for the process to make the mixture of liquid terephthalic esters (also called polyols) is that the mole ratio of all of the glycols to PET scrap is greater than 1:2:1. When this reactant mole ratio is equal to or less than 1.2:1, solids come out of the mixture after it is left standing.

An essential feature for making the liquid terephthalic polyester polyol components is the stripping of ethylene glycol (EG) during the reaction. The EG is derived from the PET during the reaction and contributes to the creation of the solids which tend to precipitate out when the mixtures are left standing. Preferably, at least 5 wt.% of the charge (recycled PET and oxyalkylene glycols) should be taken out as overhead, and at least 25 wt.% of this overhead is EG. It is especially preferred that 15 to 25 wt.% of the charge is stripped out as overhead, and most preferably, 17 to 20 wt.% as overhead.

The temperature of the preparation process of these liquid terephthalic polyester polyols should be from about 210° to 280° C. Preferably, the temperature runs from about 210° to 245° C. The pressure should generally range from 1 to 40 atmospheres, preferably from 1 to 20 atmospheres. No catalyst is necessary for this preparation. The mixture of terephthalic ester polyols should have a hydroxyl number in the range from 100 to 500, with an especially preferred range between 200 and 500.

The functionality of the product may be increased by including one or more additives into the reaction to make the terephthalic ester polyol mixtures. Such additives include alpha-methyl glucoside (AMG), glycerine, triethanolamine, diethanolamine, sorbitol and the like. Typically, the additive is present in an amount ranging from about 1 to 5 wt.% based on the total reactant charge, although larger proportions could be used. It was found that use of as much as 2.5 wt.% glycerine tended to cause the undesirable precipitation of solids. If glycerine is used as a functionality-enhancing additive, it should be used in proportions less than 2.5 wt.%. The most preferred additive in this regard is AMG.

Further details with respect to the liquid terephthalate polyester polyol components may be found in U.S. Pat. No. 4,469,824, incorporated herein by reference.

Organic Polyisocyanate

The polyisocyanate used to react with the PET-based polyester polyols mentioned above may be any aromatic or aliphatic polyisocyanate. Typical aromatic polyisocyanates include m-phenylene diisocyanate, p-phenylene diisocyanate, polymethylene polyphenylisocyanate, 2,4-toluene diisocyanate, 2,6-toluene diisocyanate, dianisidine diisocyanate, bitolylene diisocyanate, naphthalene-1,4-diisocyanate, xylylene-1,4-diisocyanate, xylylene-1,3-diisocyanate, bis(4-isocyantophenyl)methane, bis(3-methyl-4-isocyanato-phenyl)methane, and 4,4'-diphenylpropane diisocyanate and mixtures thereof.

Greatly preferred aromatic polyisocyanates used in the practice of the invention are 2,4- and 2,6-toluene diisocyanates and methylene-bridged polyphenyl polyisocyanate mixtures which have a functionality of from about 2 to about 4. These latter isocyanate compounds are generally produced by the phosgenation of corresponding methylene-bridged polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents; for example, U.S. Pat. Nos. 2,683,730; 2,950,263; 3,012,008; 3,344,162 and 3,362,979.

Most preferred methylene-bridged polyphenyl polyisocyanate mixtures preferred here contain from about 20 to about 100 weight percent methylene diphenyl diisocyanate isomers with the remainder being polymethylene polyphenyl polyisocyanates having higher functionalities and higher molecular weights. Typical of these are polyphenyl polyisocyanate mixtures containing about 20 to 100 weight percent methylene diphenyl diisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5 These isocyanate mixtures are known, commercially available materials and can be prepared by the process described in U.S. Pat. No. 3,362,979, issued Jan. 9, 1968 to Floyd E. Bentley.

As noted, aromatic and aliphatic diisocyanates are preferred. Especially preferred are toluene diisocyanates, diphenylmethane diisocyanate, isophorone diisocyanate and methylene biscyclohexylisocyanate.

Polyether Polyol Solvent

The polyether polyol found useful in making the polymer polyols employed in the RIM elastomers of this invention has a hydroxyl number preferably between about 20 and 60 (in contrast to the hydroxyl number of from 100 to 500 for the liquid terephthalic polyester polyols). The polyol is generally an alkylene oxide adduct of a polyhydric alcohol with a functionality of from about 2 to about 4. The alkylene oxide may suitably be ethylene oxide, 1,2-propylene oxide or 1,2-butylene oxide or a mixture of some or all of these. The polyol will preferably have a molecular weight within the range of from about 2,000 to about 9,000 and more, preferably from about 3,000 to about 8,000. The alkylene oxide is preferably propylene oxide or a mixture of propylene oxide and ethylene oxide.

The polyether polyol solvent can be a mixed alkylene oxide/diepoxide adduct of a polyhydric initiator, such as those described in U.S. Pat. Nos. 4,316,991; 4,309,532 and 4,323,658, incorporated by reference herein.

Polymer Polyol Manufacture

Since the polymer polyol has by definition free hydroxyl groups, the amount of polyisocyanate used to form the polymer polyol is less than the stoichiometric amount needed to satisfy the active hydrogens of the hydroxyl groups of the polyether polyol and the liquid terephthalate polyester polyol. Therefore, the ratio of equivalents of the liquid terephthalic polyester polyol to organic polyisocyanate ranges from about 1:1 to 2:1.

Preferably, the combined weight of liquid terephthalic polyester polyol and polyisocyanate is from about 5 to 25 wt.% of the polyether polyol solvent.

The liquid terephthalic polyester polyol and polyisocyanate can be successfully reacted without the application of external heat and at atmospheric pressure although higher temperatures and pressures would be acceptable. For example, the reaction temperatures could run from 25° to 100° C. and the pressures could run from atmospheric to 100 psig.

The liquid terephthalic polyester polyols described have a controlled reactivity with the diisocyanates so that stable polymers can be prepared.

Polyurethane Product Formulation

The polymer polyols of this invention have been found to be useful in reaction injection molded (RIM) elastomers and flexible foams, both polyurethane products. The RIM elastomers made from this polymer polyol had improved hot tear (green strength) and final tear properties over those made from prior art formulations. The improved tear properties, along with good modulus, were obtained using lower levels of the diethyltoluenediamine chain extenders. Use of these polymer polyols in flexible foams gives foams with higher load bearing properties.

RIM elastomers are typically made by reacting a polyol, a chain extender and a polyisocyanate all together within a mold. Optional additives include catalysts, filler materials, mold release agents and the like.

In this case, the polyol component of the RIM elastomer is the polymer polyol of this invention. It is anticipated that improved RIM elastomers could be made using polyols derived from recycled PET regardless of the method of PET incorporation. For example, the liquid terephthalic polyester polyol could be incorporated more directly into the elastomer rather than through the polymer polyol. Or, in the alternative, the polymer could incorporate recycled PET in ways other than by first transesterifying it with oxyalkylene glycols and subsequent distillation to remove ethylene glycol With respect to the polyisocyanate, many of the isocyanates already discussed would be useful in RIM elastomers.

A preferred aromatic polyisocyanate is methylene bis(4-phenylisocyanate) or MDI. Pure MDI, quasi-prepolymers of MDI, modified pure MDI, etc. are all useful in the preparation of RIM elastomers. Since pure MDI is a solid and, thus, often inconvenient to use, liquid products based on MDI are often used and are included in the scope of the terms MDI or methylene bis(4-phenylisocyanate) used herein. U.S. Pat. No. 3,394,164 is an example of a liquid MDI product. More generally uretonimine modified pure MDI is included also. This product is made by heating pure distilled MDI in the presence of a catalyst to give a mixture of pure MDI and modified MDI. Examples of commercial materials of this type are Upjohn's ISONATE ®125M (pure MDI) and ISONATE 143L ("liquid" MDI). Preferably, the amount of isocyanates used is the stoichiometric amount based on all the ingredients in the formulation or greater than the stoichiometric amount.

Of course, the term "polyisocyanate" also includes quasi-prepolymers of polyisocyanates with active hydrogen containing materials.

The chain extenders useful in these RIM elastomers herein are preferably difunctional. Mixtures of difunctional and trifunctional chain extenders are also useful in this invention. Particular chain extenders useful include diols (ethylene glycol and 1,4-butane diol, for example), amino alcohols, diamines and mixtures thereof.

The aromatic diamine chain extenders useful in these RIM elastomers include, for example, 1-methyl-3,5-diethyl-2,4-diaminobenzene, 1-methyl-3,5-diethyl-2,6-diaminobenzene (both of these materials are also called diethyltoluene diamine or DETDA), 1,3,5-triethyl-2,6-diaminobenzene, 3,5,3',5'-tetraethyl-4,4''-diaminodiphenylmethane and the like. Particularly preferred aromatic diamine chain extenders are 1-methyl-3,5-diethyl-2,4-diaminobenzene or a mixture of this compound with 1-methyl-3,5-diethyl-2,6-diaminobenzene. It is within the scope of this disclosure to include some aliphthatic chain extender materials as described in U.S. Pat. Nos. 4,246,363 and 4,269,945.

If needed, the following catalysts are useful. Catalysts such as tertiary amines or an organic tin compound or other polyurethane catalysts may be used. The organic tin compound may suitably be a stannous or stannic compound such as a stannous salt of a carboxylic acid, a trialkyltin oxide, a dialkyltin dihalide, a dialkyltin oxide, etc. wherein the organic groups of the organic portion of the tin compound are hydrocarbon groups containing from 1 to 8 carbon atoms. For example, dibutyltin dilaurate, dibutyltin diacetate, diethyltin diacetate, dihexltin diacetate, di-2-ethylhexyltin oxide, dioctyltin dioxide, stannous octoate, stannous oleate, etc., or a mixture thereof, may be used.

Tertiary amine catalysts include trialkylamines (e.g. trimethylamine, triethylamine), heterocyclic amines such as N-alkylmorpholines (e.g., N-methylmorpholine, N-ethylmorpholine, dimethyldiaminodiethyl ether, etc.), 1,4-dimethylpiperazine, triethylenediamine, etc., and aliphatic polyamines such as N,N,N',N'-tetramethyl-1,3-butane diamine. For more details on making RIM elastomers, please see U.S. Pat. Nos. 4,433,067; 4,444,703; 4,444,910 and 4,448,904, incorporated by reference.

Flexible polyurethane foams are made in much the same way as elastomers except that chain extenders are not usually employed and a blowing agent or water is added to provide the open foam quality in contrast to the solid nature of the RIM elastomers. The polyisocyanates mentioned above, both aliphatic and aromatic polyisocyanates may be used. The catalysts may also be tin compounds or tertiary amines. The polyol component is, of course, the polymer polyol of this invention.

For further details on making flexible polyurethane foams, please see U.S. Pat. Nos. 4,316,991; 4,338,408 and 4,348,488, incorporated herein by reference, for example.

The invention will now be illustrated with the aid of the following examples which are intended to illuminate the invention concepts but are not intended to delineate the expected scope of the invention.

EXAMPLE 1

This example will show the preparation of an extender diol by reaction of diethylene glycol with recycled PET. This diol was used in the preparation of polymer polyols described in Examples 2, 3 and 4.

Into a five-gallon stirred autoclave were added 3200 g PET chips and 4800 g diethylene glycol. The reactor was then flushed with nitrogen and heated to 220° C. After three hours at 220°–230° C. a total of 800 ml of overhead was collected. The overhead contained 5.7% water, 75.9% ethylene glycol, and 18.4% diethylene glycol. The product was a liquid which had the following properties:
  Hydroxyl no., mg KOH/g: 493
  Saponification no., mg KOH/g: 261
  Viscosity, 77° F., cs: 500

EXAMPLE 2

This example will illustrate the preparation of the polymer polyols used in the RIM elastomers of this invention.

Into a one-liter three-necked flask equipped with a stirrer, thermometer, dropping funnel, condenser and nitrogen source were charged 450 g of a 5000 molecular weight high reactivity triol (THANOL® SF-5505, supplied by Texaco Chemical Co.), 31 g of a 493 hydroxyl number extender diol made by reaction of diethylene glycol and PET chips as described in Example 1, and 0.02 g dibutyltin dilaurate. The reactants were then heated to 40° C. and toluene diisocyanate (14 g) was added dropwise over a 15 minute period. With no external heat applied, the reaction mixture heated to 45°–55° C. over a 3.75 hour period. The product was then poured into a wide-mouthed quart bottle and blanketed with nitrogen. The product was a clear, blue viscous liquid which had the following properties:
  Acid no., mg KOH/g: 0.02
  Hydroxyl no., mg KOH/g: 40.3
  Water, wt.%: 0.04
  Viscosity, 77° F., cps: 4700
  Equivalents DEG PET Polyol/TDI: 1.25

EXAMPLE 3

This example will illustrate the preparation of a polymer polyol using a liquid diphenylmethane diisocyanate (ISONATE® 143L). Into a one-liter three-necked flask equipped with a stirrer, thermometer, condenser, dropping funnel, and nitrogen source were charged 450 g of THANOL® SF-5505, 25.5 g of the diethylene glycol-PET extender diol of Example 1 and 0.02 g dibutyltin dilaurate. The reaction mixture was then heated to 44° C. and 24.5 g ISONATE 143L added dropwise over a 15 minute period. With no external heat applied, the reaction mixture heated to 38°–46° C. over a 4.5 hour period. The product was then poured into a wide-mouthed quart bottle and blanketed with nitrogen. The finished product was a clear blue, viscous liquid which had the following properties:
  Acid no., mg KOH/g: 0.033
  Hydroxyl no., mg KOH/g: 37.8
  Water, wt.%: 0.1
  pH in 10:6 isopropanol/water: 6.7
  Viscosity, 77° F., cps: 5700
  Equivalents DEG PET polyol/ISONATE 143L: 1.25

EXAMPLE 4

This example is a scale-up preparation of a polymer polyol used in the RIM elastomers of this invention.

Into a ten-gallon kettle were charged 72 lbs. of THANOL SF-5505, 4.35 lb. of the diethylene glycol PET polyol of Example 1, and 1.5 g dibutyltin dilaurate. The reactor was then purged with nitrogen. The reaction charge was then heated to 40° C. ISONATE 143L (3.65 lb) was then added slowly to the kettle. The reaction mixture was then heated for three hours at 40°–50° C. and drained from the kettle. The product was a clear, blue, viscous liquid with the following properties:
  Acid no., mg KOH/g: 0.035
  Hydroxyl no., mg KOH/g: 30.0
  Water, wt.%: 0.03
  pH in 10:6 isopropanol/water: 7.0
  Viscosity, 77° F., cps: 5140
  Equivalents DEG PET polyol/ISONATE 143L: 1.5

EXAMPLE 5

This example will illustrate the preparation of the diethylene glycol, dipropylene glycol, PET diol used in the polymer polyol preparation described in Example 6.

Into a five-gallon stirred autoclave were charged 6000 g PET chips, 5400 g diethylene glycol, and 3600 g dipropylene glycol. The contents were flushed with nitrogen and heated to 220° C. After three hours at 220°–250° C. a total of 1500 ml overhead had been collected. The overhead contained 2.4% water, 54.5% ethylene glycol, 10.5% diethylene glycol, and 29.2% dipropylene glycol. The reactor was cooled to room temperature and an additional 3000 g PET chips added to the autoclave. The contents were flushed with nitrogen and heated to 220° C. After three hours at 230° C. a total of 1650 ml of overhead was collected which contained 1.7% water, 30.9% dipropylene glycol, 49.7% ethylene glycol and 15.4% diethylene glycol. The product was a liquid which had the following properties:
  Hydroxyl no., mg KOH/g: 268
  Saponification no., mg KOH/g: 386
  Viscosity, 77° F., cs: 17362

EXAMPLE 6

This example will illustrate the preparation of a polymer polyol using an extender polyol made by reaction of diethylene glycol and dipropylene glycol with recycled PET resin (hydroxyl no., mg KOH/g 268). The preparation of the extender polyol is described in Example 5.

Into a two-liter three-necked flask equipped with a stirrer, thermometer, condenser, dropping funnel and nitrogen source were charged 900 g of THANOL® SF-5505, 64.7 g of the above PET polyol and 0.04 g dibutyltin dilaurate. The reaction mixture was then heated to 48° C. and 35.3 g ISONATE 143L added over a 15 minute period. The reaction charge was then held at 48°–58° C. for two hours with no external heat applied. The product was a light blue viscous dispersion which had the following properties:

Acid no., mg KOH/g: 0.1
Hydroxyl no., mg KOH/g: 34.2
Water, wt.%: 0.12
Viscosity, 77° F., cps: 5510
Equivalents PET polyol/ISONATE 143L: 1.25

EXAMPLES 7 AND 8

These examples will illustrate the preparation of the RIM elastomers of this invention using the PET-based polymer polyol of Example 4. It will further show the improved hot tear (green strength) and final tear strength of the elastomer as compared to those made from a prior art formulation. This was accomplished using lower levels of the diethyltoluenediamine chain extender. The elastomers were prepared on an Accuratio VR-100 RIM machine. Formulations, details of preparation, and elastomer properties are shown in the following table:

|  | 7 | 8 |
|---|---|---|
| Formulation, pbw |  |  |
| Polymer polyol of Ex. 4 | 80 | — |
| THANOL ® SF-5505[1] | — | 80 |
| Diethyltoluenediamine | 18.9 | 20 |
| Dibutyltin dilaurate | 0.1 | 0.1 |
| MONDUR ® PF[2] | 49.34 | 52.84 |
| Isocyanate index | 1.05 | 1.05 |
| Processing Details |  |  |
| Postcure, °F. | 250 | 250 |
| Release time/NCO index | 30 sec/1.05 | 30 sec/1.05 |
| Mold/room temperature, °F. | 165/95 | 160/86 |
| A/B[3] temperature, °F. | 115/130 | 110/110 |
| Throughput, lb/min/N$_2$ pot pressure | 90/60 | 90/60 |
| Ratio speed | 1027 | 1066 |
| A/B ratio, volume | 0.412 | 0.436 |
| Dispense counter | 825 | 825 |
| Shot time, sec. | 1.12 | 1.1 |
| A/B inj. pressure | 2200/1900 | 2100/1980 |
| Properties |  |  |
| Shore D hardness | 52/46 | 51/46 |
| Tensile, psi | 2795 | 3468 |
| Elongation, % | 297 | 357 |
| Tear, pli | 457 | 406 |
| Flex. Mod. Room Temp. | 33582 | 30384 |
| Flex. Mod. 158° F. | 17799 | 19053 |
| Flex. Mod. −20° F. | 113245 | 89979 |
| Flex. Mod. 311° F. | — | 13387 |
| Heat sag, 250° F., 60 min. | 14.0 | 11.95 |

[1]5,000 molecular weight high reactivity triol made by Texaco Chemical Co.
[2]Diphenylmethane diisocyanate-glycol quasi-prepolymer made by the Mobay Co.
[3]A/B refers to the A-component and the B-component.

EXAMPLES 9-11

These examples show the use of a polymer polyol made by reaction of a 493 hydroxyl number diethylene glycol-PET polyol with toluene diisocyanate in a 5,000 molecular weight propylene oxide adduct of glycerine solvent in the preparation of flexible foams. It will further show the increased load bearing properties of the foams as compared to those made from a 3,000 molecular weight propylene oxide/ethylene oxide/diglycidyl ether of Bisphenol A adduct of glycerine. Formulation, details of preparation, and foam properties are shown in the following table.

|  | 9 | 10 | 11 |
|---|---|---|---|
| Formulation, pbw |  |  |  |
| Polymer polyol (hydroxyl no., mg KOH/g 34.5) | 50 | — | — |
| THANOL ® F-3050[1] | 50 | 100 | — |
| THANOL F-3016[2] | — | — | 100 |
| Water | 4.0 | 4.0 | 4.0 |
| L-6202 silicone[3] | 1.0 | 1.0 | 1.0 |
| THANCAT ® TD-33[4] | 0.3 | 0.3 | 0.3 |
| 50% stannous octoate in dioctylphthalate | 0.5 | 0.4 | 0.5 |
| Toluene diisocyanate | 46 | 49.7 | 49.7 |
| Isocyanate index | 1.05 | 1.05 | 1.05 |
| Details of Preparation |  |  |  |
| Cream time, sec. | 13 | 12 | 12 |
| Rise time, sec. | 93 | 95 | 100 |
| Properties |  |  |  |
| Density, pcf | 1.77 | 1.67 | 1.74 |
| Chatillon gauge[5], lb (reading at 25%) | 5.3 | 4.55 | 4.16 |

[1]3,000 molecular weight propylene oxide/ethylene oxide/diglycidyl ether of bisphenol A adduct of glycerine made by Texaco Chemical Co. in accordance with U.S. Pat. No. 4,316,991.
[2]3,000 molecular weight triol ethylene oxide/propylene oxide adduct of glycerine made by Texaco Chemical Co.
[3]A silicone surfactant made by Union Carbide Chemical Corp.
[4]33% triethylenediamine in propylene glycol made by Texaco Chemical Co.
[5]Manual model LIC compression tester manufactured by John Chatillon and Sons, Inc.

Many modifications may be made in the RIM elastomers of this invention without departing from the spirit and scope thereof, which are defined only by the appended claims. For example, it may be found that a particular proportion of liquid terephthalic polyester polyol or polyisocyanate or reaction temperature or mode of addition imparts advantageous or improved properties to the RIM elastomers.

We claim:

1. A reaction injection molded elastomer made by reacting in a closed mold ingredients comprising a polyol derived from recycled polyethylene terephthalate, an amine terminated chain extender and a polyisocyanate wherein
the polyol derived from recycled polyethylene terephthalate is a polymer polyol made by reacting
  a. a liquid terephthalic polyester polyol derived from recycled polyethylene terephthalate, with
  b. an organic polyisocyanate in the presence of
  c. a polyether polyol solvent.

2. The elastomer of claim 1 in which the liquid terephthalic polyester polyol derived from recycled polyethylene terephthalate is produced by the process comprising
  a. reacting recycled polyethylene terephthalate with an oxyalkylene glycol and
  b. stripping ethylene glycol from the reaction to give a mixture of esters which is free from solids upon standing.

3. A reaction injection molded elastomer made by reacting in a closed mold ingredients comprising a polymer polyol, an amine terminated chain extender and a polyisocyanate where the polymer polyol is made by the process comprising reacting
  (a) a liquid terephthalic polyester polyol produced by the process comprising
    (1) reacting recycled polyethylene terephthalate with an oxyalkylene glycol and
    (2) stripping ethylene glycol from the reaction to give a mixture of esters which is free from solids upon standing, with (b) an organic polyisocyanate in the presence of
(c) a polyether polyol solvent.

4. The elastomer of claim 3 in which the mole ratio of glycols to recycled polyethylene terephthalate in the liquid terephthalic polyester polyol is greater than 1.2:1.

5. The elastomer of claim 3 in which the oxyalkylene glycol, used in the liquid terephthalic polyester polyol, has the formula $$HO-(CH_2CHO)_n-H$$
$$|$$
$$R$$

where R is hydrogen or lower alkyl of 1 to 4 carbon atoms and n is from 2 to 10.

6. The elastomer of claim 3 in which the oxyalkylene glycol is a mixture of diethylene glycol and at least one more oxyalkylene glycol.

7. The elastomer of claim 3 in which in the stripping step in the making of the liquid terephthalic polyester polyol, at least 5 wt.%, based on the reactants charged, is taken off as overhead and at least 25 wt.% of the overhead is ethylene glycol.

8. The elastomer of claim 3 in which the liquid terephthalic polyester polyol is made at a temperature in the range from about 190° to 280° C. and at a pressure between about 1 to 20 atmospheres.

9. The elastomer of claim 3 in which the liquid terephthalic polyester polyol has an average hydroxyl number between 200 and 500.

10. The elastomer of claim 3 in which the ratio of equivalents of liquid terephthalic polyester polyol to organic polyisocyanate ranges from 1:1 to 2:1.

11. The elastomer of claim 3 in which in the polymer polyol, the combined weight of the liquid terephthalic polyester polyol and organic polyisocyanate is about 5 to 25 wt.% of the polyether polyol solvent.

12. The elastomer of claim 3 in which organic polyisocyanate in the polymer polyol is selected from the group consisting of toluene diisocyanate, diphenylmethane diisocyanate, isophorone diisocyanate and methylene bis-cyclohexylisocyanate.

13. The elastomer of claim 3 in which the polyether polyol solvent has a molecular weight in the range of about 3,000 to 8,000.

14. The elastomer of claim 3 in which the polyether polyol solvent has a hydroxyl number in the range of about 20 to 60 and a hydroxyl functionality of about 2 to 4.

15. The elastomer of claim 3 in which the polyisocyanate is a quasi-prepolymer.

16. A method of making a reaction injection molded elastomer comprising reacting in a closed mold a polymer polyol, an amine terminated chain extender and a polyisocyanate, where the polymer polyol is made by the process comprising reacting
   a. a liquid terephthalic polyester polyol produced by the process comprising
      (1) reacting recycled polyethylene terephthalate with an oxyalkylene glycol and
      (2) stripping ethylene glycol from the reaction to give a mixture of esters which is free from solids upon standing, with
   (b) an organic polyisocyanate in the presence of
   (c) a polyether polyol solvent.

17. The method of claim 16 in which in making the liquid terephthalic polyester polyol, the oxyalkylene glycol consists of diethylene glycol and at least one more oxyalkylene glycol which has the formula $$HO-(CH_2CHO)_n-H$$
$$|$$
$$R$$

where R is hydrogen or lower alkyl of 1 to 4 carbon atoms and n is from 2 to 10, and in the stripping step, at least 5 wt.%, based on the reactants charged, is taken off as overhead and at least 25 wt.% of the overhead is ethylene glycol.

18. The method of claim 16 in which in the making of the liquid terephthalic polyester polyol, the mole ratio of glycol to recycled polyethylene terephthalate is greater than 1.2:1 and the resultant liquid terephthalic polyester polyol has an average hydroxyl number between 200 and 500.

19. The method of claim 16 in which in the making of the polymer polyol, the ratio of equivalents of liquid terephthalic polyester polyol to organic polyisocyanate ranges from 1:1 to 2:1 and the combined weight of the liquid terephthalic polyester polyol and organic polyisocyanate is about 5 to 25 wt.% of the polyether polyol solvent.

20. The method of claim 16 in which in the making of the polymer polyol, the polyether polyol solvent has a molecular weight in the range of about 3,000 to 8,000, a hydroxyl number in the range of about 20 to 60 and a hydroxyl functionality of about 2 to 4.

* * * * *